Feb. 22, 1927. 1,618,894
W. C. SMOCK
INDICATOR AND AUTOMATIC WATER SUPPLY FOR STORAGE BATTERIES
Filed May 28, 1926 2 Sheets-Sheet 1
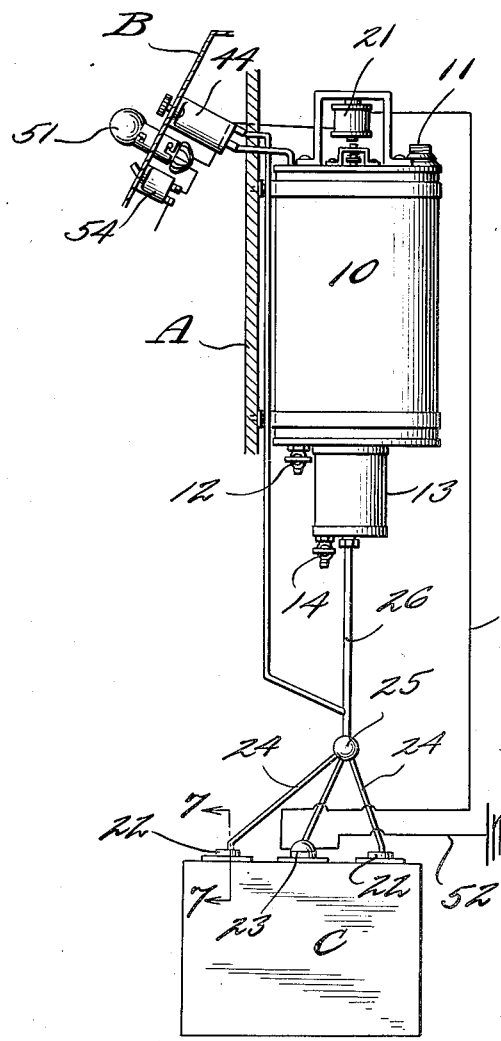
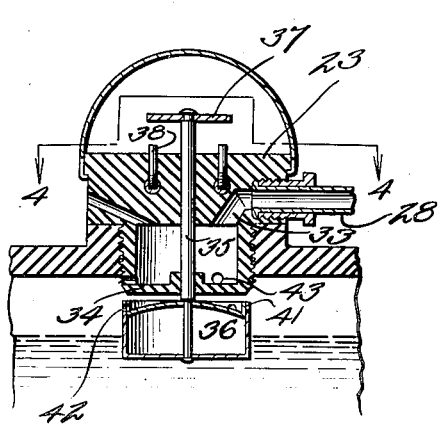
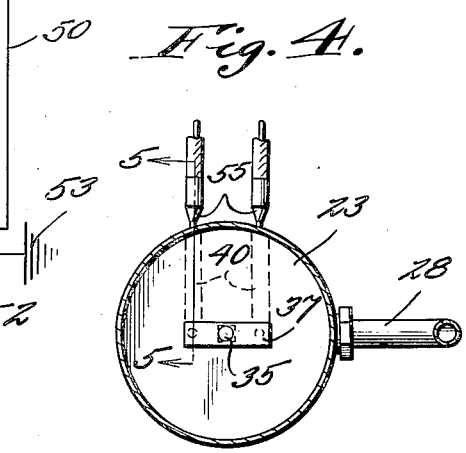
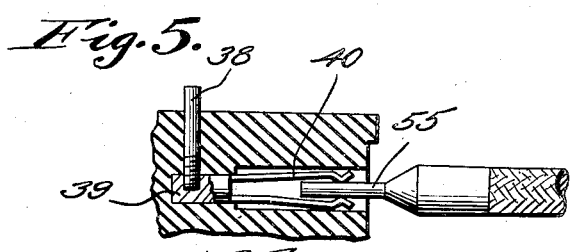
William C. Smock
INVENTOR
BY Victor J. Evans
ATTORNEY
WITNESS:

Feb. 22, 1927.
W. C. SMOCK
1,618,894
INDICATOR AND AUTOMATIC WATER SUPPLY FOR STORAGE BATTERIES
Filed May 28, 1926      2 Sheets-Sheet 2
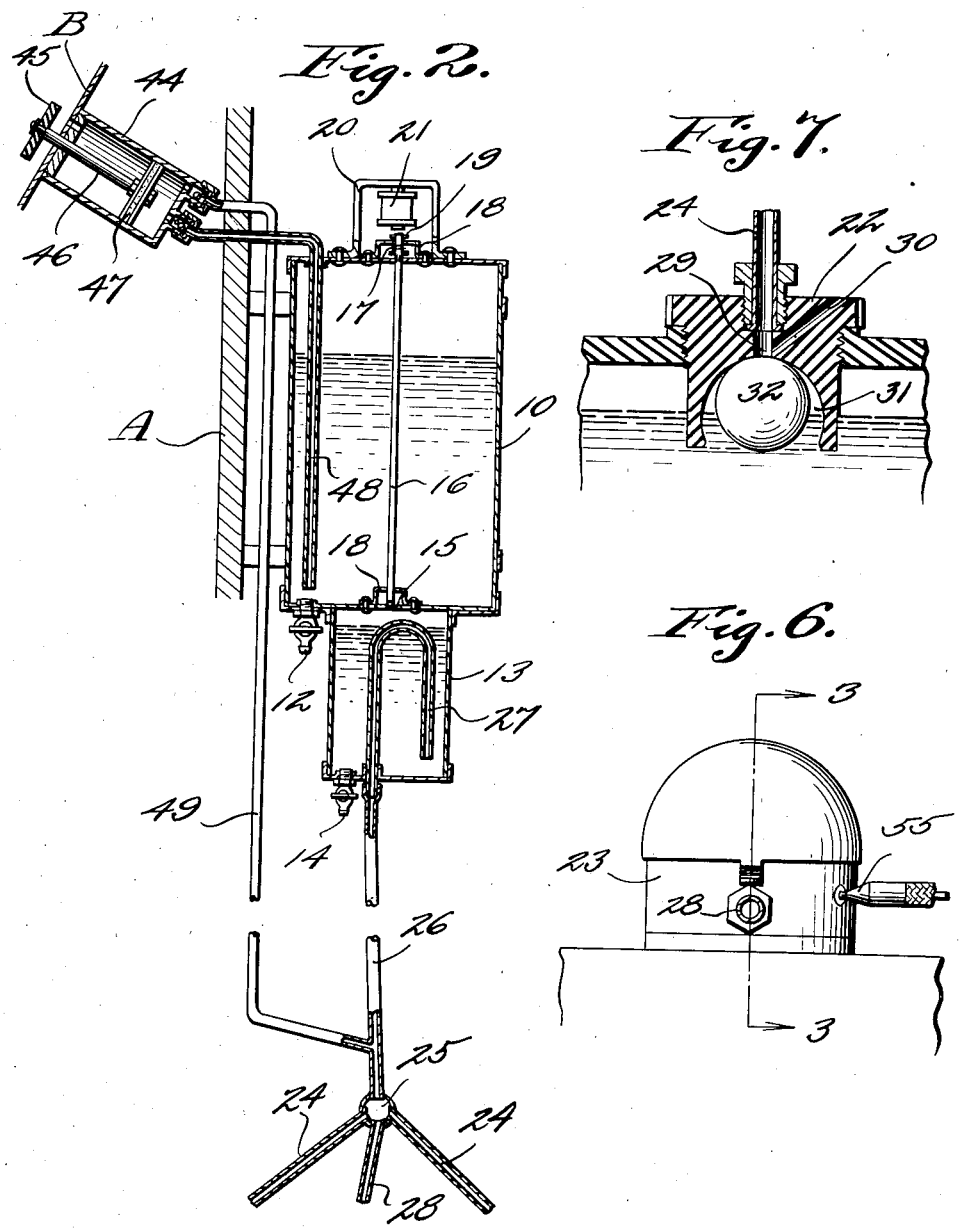
William C. Smock
INVENTOR
BY Victor J. Evans
ATTORNEY Patented Feb. 22, 1927.

1,618,894

UNITED STATES PATENT OFFICE.

WILLIAM C. SMOCK, OF BURROWS, INDIANA.

INDICATOR AND AUTOMATIC WATER SUPPLY FOR STORAGE BATTERIES.

Application filed May 28, 1926. Serial No. 112,356.

This invention relates to devices for use in connection with storage batteries, such as those used on motor vehicles and has for its object the provision of a novel alarm device associated with a storage battery and actuated when the water supply within the storage battery reaches a dangerously low level, the device further including means for automatically supplying the necessary water to the battery when the supply is too low.

An important and more specific object is the provision of a device of this character for use in connection with storage batteries embodying a water reservoir together with electromagnetically operated valve means connected therewith or forming part thereof whereby water will be automatically supplied to all of the cells of the storage battery when the level therein is dangerously low.

Another object is to provide a device of this character which will give a visible signal to the operator of the vehicle or other attendant in case the water level is low, the signal device being in series with the electromagnetic control means for the water outlet valve.

Yet another object is the provision of a device of this character which will be comparatively simple and inexpensive in manufacture and installation, positive in action, efficient and durable in service, and a general improvement in the art.

With the above and other objects and advantages in view, the invention consists in the novel construction and arrangement of elements to be hereinafter more fully described and claimed, and illustrated in the accompanying drawings, in which:—

Figure 1 is a side elevation of the device, showing it associated with a storage battery carried by a motor vehicle, a portion of the latter being broken away and in section to illustrate the construction more clearly, the circuit diagram being also shown.

Figure 2 is a vertical longitudinal section through the water supply device and electromagnetic means controlling the flow thereof, the battery being omitted.

Figure 3 is a detail view of the circuit closer, the view being taken on the line 3—3 of Fig. 6.

Figure 4 is a cross section on the line 4—4 of Fig. 3,

Figure 5 is a detail section showing the detachable connection, taken on the line 5—5 of Fig. 4, Figure 6 is a side elevation of the circuit closer device, Figure 7 is a detail section through one of the plugs, taken on the line 7—7 of Fig. 1.

Referring more particularly to the drawings, the letter A designates a portion of the dash of a motor vehicle, B the instrument board, and C the storage battery.

In carrying out the invention, I provide a tank 10 mounted at any suitable point, as for example, upon the dash A, the tank being held by any preferred means, such details being immaterial. This tank is intended to contain water and is provided with a suitable filling opening normally closed by a removable cap or plug 11. The tank is also provided at its bottom with a drain valve 12 so that the contents may be drained out whenever such is desired. Secured to the bottom portion of the tank and extending therebelow, is a cup-like reservoir 13 which is likewise provided with a drain cock 14 and which has communication with the tank 10 through an opening 15 normally closed by a valve stem or rod 16 which is slidably mounted axially of the tank 10 and which is normally urged into closed position by a spring 17. Suitable guides or bearing members 18 are provided at the top and bottom of the tank so that the rod or stem 16 will be properly guided at all times. At its upper end, the rod 16 carries an armature 19 for a purpose to be described.

Suitably secured to the top of the tank is a bracket 20 within which is mounted an electromagnet 21 positioned adjacent the armature 19 so as to attract the same when energized. Obviously, there is no limitation as to the type of bracket employed inasmuch as various devices of an equivalent nature may be provided to equal advantage.

It is well known that the usual storage battery used in connection with motor vehicles is of the three cell type and is provided at each cell with a removable cap so that the supply of water may be replenished when necessary. In accordance with the present invention, the ordinary caps are removed and replaced by other caps, two of which are designated by the numeral 22 and the third by the numeral 23. The difference between the caps 22 and the ordinary variety is that the caps 22 have connected therewith, by suitable connections, of course, tubes 24 which connect with a manifold device 25 which may be of a hollow ball formation, the member 25 having connected therewith a flexible tube 26, such as a rubber hose, which is in turn connected with a siphon 27 located within the auxiliary casing or reservoir 13. Connected with the cap 23 is also a similar tube 28 corresponding to the tubes 24, all of the tubes 24 and the tube 28 being designed to permit flow of water from the reservoir 13 into the various cells of the battery as circumstances may require and in accordance with the means to be described. Each cap 22 has an axial opening 29 communicating with the tube 24, and an inclined opening 30 communicating with the opening 29 and the atmosphere. The underside of each cap 22 is recessed at 31 and located within the recess is a floating ball 32 acting as a valve.

The cap 23 differs in construction from the caps 22 inasmuch as the tube 28 enters at the side and discharges to an eccentric opening 33. Furthermore, the cap 23 is provided internally with a partition member 34 which serves as a guide for a vertically movable stem 35 which is provided at its lower end with a float 36 and its upper end with a contact 37. The cap 23 carries a pair of spaced contacts 38 adapted to be engaged and bridged by the contact 37 when the float 32 drops to a low level owing to the shortage of water in the particular cell with which this cap is associated.

Each contact 38 is connected with one end of a metallic terminal member 39 located within the cap 23, the terminal member being provided with resilient fingers 40, the construction being very similar to that of telephone jacks and being provided so that conductors may be quickly and easily connected with or disconnected from the device when such is necessary.

The float 36 above described is represented as having an upstanding flange 41 provided with a drain opening 42, and the lower portion of the plug or cap 23, that is to say the portion which enters within the storage battery is provided with holes 43 so that water entering above the bottom 34 will not fall upon the float 36 and interfere with its proper action, the top of the float having drain openings which will positively permit any water falling thereon to drain off instead of accumulating.

I also prefer to make use of a pump 44 mounted upon the instrument board B and having an operating handle 45 connected by a stem 46 with the pump plunger 47. This pump has suitable check valves as is common in force pumps and connected with one is an inlet pipe or tube 48 leading into the tank 10, and connected with the other is an outlet pipe 49 which leads into the member 26 at a point spaced in advance of the manifold 25 as clearly indicated in Figure 2. The purpose of this pump is to start the action of the siphon 27 whenever such is necessary.

In so far as the electrical connections are concerned, one contact 38 is connected by a conductor 50 with one terminal of the electromagnet 21 which has its other end connected with the storage battery of the car or with any other suitable source of current, it being preferable that an incandescent lamp 51 be interposed in this circuit so as to give a visible indication to the operator of the car whenever the circuit is closed through the contacts 38. The other contact 38 may have connected therewith a conductor 52 which is grounded at 53. If desired, a cutoff switch 54 of any ordinary or preferred type may be provided in the circuit, and as a matter of fact, it is preferable that the switch 54 and telltale lamp 51 be suitably mounted upon the instrument board B of the vehicle. The conductors 50 and 52 carry terminal plugs 55 adapted to be engaged within the jack-like spring sockets 40, connection and disconnection being consequently very simple.

In the operation of the device, it will be readily apparent that when the level of the water within the various cells of the storage battery is normal, the stem 35 and float 36 thereon will be in elevated position, the contact 37 being therefore out of engagement with the contacts 38. Obviously, no current can flow through the apparatus. However, in case the level of the water within the storage battery becomes lower than is proper, it is quite clear that the float 36 will lower and the contact 37 will then come into engagement with the contacts 38, bridging the same so that the current or circuit will be completed through the electromagnet 21. When this occurs, the electromagnet will be energized and will attract the armature 19 on the upper end of the rod or stem 16, resulting in unseating of this valve stem or rod so that water will flow into the reservoir 13. Owing to the fact that this reservoir 13 constitutes a siphon chamber, it is quite clear that the water therein will then be led out into the member 25 and will be distributed thereby through the tubes 24 and 28 into the various cells of the battery until the water level becomes normal, whereupon the float 32 will rise and the contact 33 will be moved out of engagement with the contact 34, thus breaking the circuit. It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. In combination with a storage battery having a plurality of cells each equipped with a closure cap, water supply means for the respective cells comprising a water reservoir, a siphon tube located below the reservoir, a manifold connected with the siphon tube, a plurality of separate tubes leading from the manifold to the respective closure caps for the battery cells, an electromagnetically operated and normally closed valve for controlling the flow of water from the reservoir to the siphon, a circuit closer carried by one of the caps and float operating means to control said electromagnetic means.

2. In combination with a storage battery having a plurality of cells each equipped with a closure cap, water supply means comprising a water reservoir, a chamber located beneath the water reservoir, a siphon tube located within the chamber and connected with all of the caps, a valve controlling communication between the reservoir and said chamber, electromagnetic means for operating said valve, and a circuit closer carried by one of the caps and including float operated means for actuating the same, said circuit closer being connected with said electromagnetic valve means for controlling actuation thereof.

3. In combination with a storage battery having a plurality of cells each equipped with a closure cap, water supply means comprising a water reservoir, a chamber located beneath the water reservoir, a siphon tube located within the chamber and connected with all of the caps, a valve controlling communication between the reservoir and said chamber, electromagnetic means for operating said valve, and a circuit closer carried by one of the caps and including float operated means for actuating the same, said circuit closer being connected with said electromagnetic valve means for controlling actuation thereof, and a pump connected with said reservoir for starting the siphon.

4. The combination with a storage battery having a plurality of cells each equipped with a closure cap, of a reservoir for water, a manifold, tubes leading from the manifold to the respective caps of the cells of the storage battery, a float operated circuit closer carried by one of the caps, an electromagnetic switch mechanism for controlling the flow of water to the reservoir, connected with said circuit closing mechanism, the reservoir having a valve controlled outlet including a valve carried by a stem, an armature on the valve stem and an electromagnet positioned to attract the armature and connected with a control circuit.

In testimony whereof I affix my signature.

WILLIAM C. SMOCK.